March 20, 1945.  E. V. KINSMAN  2,372,005

ELECTRIC CONTROL CIRCUIT

Filed June 22, 1942

Inventor:
Earle V. Kinsman,
by Harry E. Dunham
His Attorney.

Patented Mar. 20, 1945

2,372,005

UNITED STATES PATENT OFFICE 2,372,005

ELECTRIC CONTROL CIRCUIT

Earle V. Kinsman, Scotia, N. Y., assignor to General Electric Company, a corporation of New York Application June 22, 1942, Serial No. 447,925

12 Claims. (Cl. 250—27)

My invention relates to electric control systems and more particularly to electric valve circuits which provide a timing operation.

Because of the accuracy and precision of control obtainable by use of electric valve means or electric discharge devices, it is frequently desirable to employ devices of this nature in timing circuits or time delay relays of the electronic type. In accordance with the teachings of my invention described hereinafter, I provide a new and improved electric valve control circuit which affords greater accuracy and precision of operation than that afforded by the prior art arrangements, and which is of simple construction and arrangement, obtaining thereby an improvement in apparatus economy.

It is an object of my invention to provide a new and improved electric control circuit.

It is another object of my invention to provide a new and improved time delay circuit.

It is a further object of my invention to provide a new and improved electronic time delay circuit which effects energization of a load circuit a predetermined interval of time after the initiation of a circuit controlling operation.

It is a still further object of my invention to provide an electric timing circuit wherein accurate timing is obtainable from an alternating current circuit, even though the voltage of the circuit varies within appreciable limits.

Briefly stated, in the illustrated embodiment of my invention, I provide a new and improved electric timing circuit wherein a capacitance is charged at a predetermined rate through an inductive device, such as a transformer, which is energized from an alternating current circuit. Constant current means are connected between the alternating current circuit and the inductive device so that the output voltage of the inductive device remains substantially constant within an appreciable change in magnitude of the alternating voltage, thereby charging the capacitance at a substantially constant rate and affording an accurate timing means substantially independent of supply voltage variations.

Figure 1:
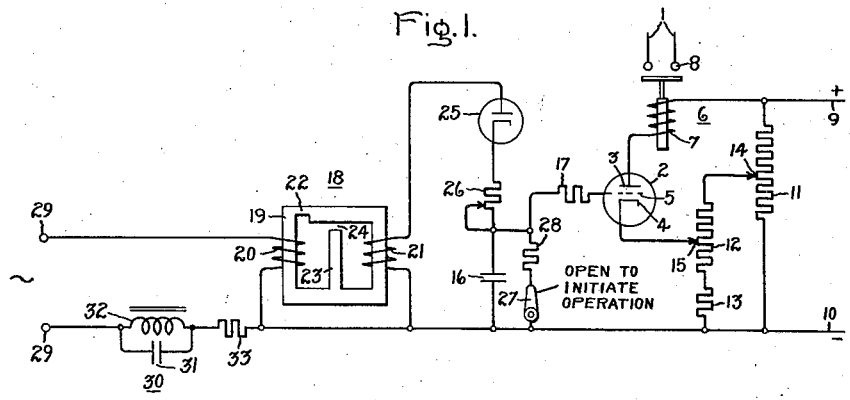
Figure 2:
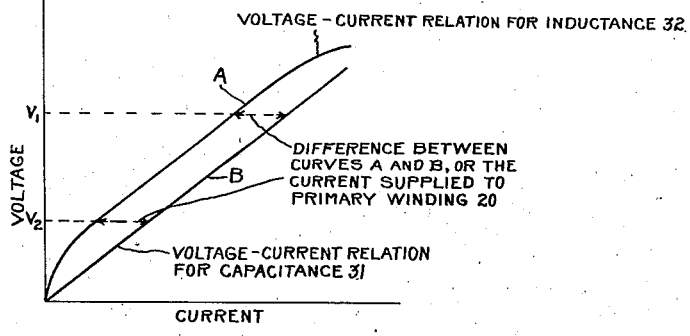

For a better understanding of my invention, reference may be had to the following description taken in connection with the accompanying drawing, and its scope will be pointed out in the appended claims. Fig. 1 diagrammatically illustrates an embodiment of my invention as applied to an electronic time delay relay wherein the energization of an electric circuit is controlled in response to a circuit controlling operation. Fig. 2 represents certain operating characteristics of the constant current means which is connected to the transformer which charges the capacitance of the timing circuit.

Referring now to Fig. 1 of the accompanying drawing, I have there illustrated my invention as applied to an electric control and timing circuit for controlling the energization of an electric circuit 1. I provide means for controlling the energization of the electric circuit 1, and more particularly I provide means for closing this circuit a predetermined interval of time after the initiation of a circuit controlling operation. For example, I provide an electric discharge device 2 which is preferably of the high vacuum type comprising an anode 3, a cathode 4 and a control member or control grid 5. If desired, the actual closure of the circuit 1 may be accomplished by employing a contactor or relay 6 having an actuating coil 7 which is connected in the anode-cathode circuit of electric discharge device 2, and which is provided with contacts 8 connected to circuit 1.

As a means for providing a biasing potential such as a negative unidirectional biasing potential which is impressed on control grid 5 and which tends to maintain the electric discharge device 2 normally nonconducting, I provide a source of direct current comprising a positive conductor 9 and a negative conductor 10, and voltage dividing means comprising resistances 11, 12 and 13. Resistances 11 and 12 may be provided with adjustable contacts 14 and 15 to control or establish the predetermined time delay which the circuit provides.

I provide a capacitance 16 which is connected to control grid 5 of the electric discharge device 2 through a current limiting resistance 17. Capacitance 16 determines the resultant potential of the control grid 5. I also provide means for charging the capacitance 16 to raise the potential of the grid 5 to a predetermined value sufficient to render the electric discharge device 2 conducting within a predetermined interval of time after the initiation of the circuit operation. This charging means comprises an inductive device, such as a transformer 18, which may be of the saturable type comprising a core member 19, primary winding means 20 and secondary winding means 21. The magnetic core member 19 may be of the type having a saturable restricted portion 22 of a highly permeable material, and is provided with an intermediate leg 23 having a high reluctance portion such as an air gap 24. The voltage of peaked wave form induced in the secondary winding means 21 is employed to charge the capacitance 16, and is connected thereto through a unidirectional conducting device 25 and a resistance 26.

I provide a discharge circuit connected across the capacitance 16 and which comprises a circuit controlling or switching means 27 and a resistance 28. When the switching means 27 is in the closed circuit position, capacitance 16 is discharged and the grid 5 is connected to a relatively negative point of the voltage divider or to the negative conductor 10 of the direct current source. Initiation of operation of the system is accomplished by opening the switching means 27 so that the capacitance 16 is charged from the secondary winding means 21.

In order to obtain a substantially constant charging rate of the capacitance 16 and to obtain thereby an accurate timing operation, I connect between an alternating current circuit 29 and the primary winding means 20 a constant current means to render the magnitude of the output voltage of the secondary winding means 21 independent of voltage variations of the alternating current circuit 29. More particularly, I provide a parallel resonant circuit 30 of the non-linear type comprising a capacitance 31 and an inductance 32 designed relative to each other so that the difference in the currents conducted thereby remains substantially constant throughout an appreciable range in the magnitude of the voltage of the alternating current circuit 29. If desired, a current limiting or controlling resistance 33 may be provided in series relation with the parallel resonant circuit and the primary winding means 20.

The operation of the embodiment of my invention shown in Fig. 1 will be explained by considering the system when it is desired to effect energization or closure of circuit 1 a predetermined interval of time after the switching means 27 is moved to the open circuit position. Initially, when the switching means 27 is closed the biasing voltage impressed on the control grid 5 of the electric discharge device 2 is sufficiently negative to maintain this discharge device nonconducting so that the actuating coil of the relay 6 is not energized.

Upon opening of the switching means 27, the voltage impressed on the control grid 5 does not change instantaneously because of the necessary time delay incident to the charging operation of capacitance 16. The output voltage of the secondary winding means 21 is employed to charge capacitance 16. By virtue of the poling of the unidirectional conducting device 25, only the positive impulses of the peaked output voltage are employed and consequently a series of positive impulses of current are transmitted to charge capacitance 16. Each charge serves to raise the potential of the upper plate of the capacitance 16; and at a predetermined time determined by the setting of contact 14 or 15, or by the adjustment of resistance 26, the potential of control grid 5 is raised sufficiently to overcome the effect of the biasing potential and to render electric discharge device 2 conducting. As soon as the discharge device 2 conducts current, the actuating coil 7 of relay 6 is energized thereby effecting closure of its contacts 8.

Because the capacitance 16 is charged during only a very small portion of each cycle of voltage of circuit 29, due to the sharp or peaked output voltage produced by secondary winding means 21, the total or resultant charge of capacitance 16 builds up much more slowly than would be effected if the charging circuit were supplied with a full sine wave voltage or a unidirectional voltage. Accordingly, for a given time delay setting of the relay, a smaller value of the resistance 26 may be employed which offers a decided advantage when long time delay intervals are desired, inasmuch as the leakage effects will be smaller. Furthermore, if the value of resistance 26 is varied to change the time delay, the smaller values of resistance will permit a better mechanical design of resistance 26 and will afford thereby a better time calibration.

After the electric discharge device 2 has been rendered conducting, relay 6 remains energized until the system is reset by the closure of the switching means 27. Upon closure of switching means 27, the capacitance 16 is discharged and electric discharge device 2 is rendered non-conducting by virtue of the biasing potential which is derived from the voltage divider or the negative conductor 10.

The operation of the constant current means and the transformer 18 will now be considered. By supplying a substantially constant current to the primary winding means 20, I provide an arrangement wherein the total flux of the core member 19 and the flux linking the secondary winding means 21 remains substantially constant irrespective of voltage variations of circuit 29. In this manner, the magnitude of the peaked voltage induced in secondary winding 21 also remains constant even though the voltage of circuit 29 varies within substantial limits.

The parallel resonant circuit 30 is designed so that the difference between the capacitive current and the inductive current thereof remains substantially constant throughout wide ranges of voltage of the alternating current circuit 29. The circuit connected to the alternating current circuit 29 is tuned to the frequency of the latter circuit. Inasmuch as the capacitive current and the inductive current are 180 electrical degrees out of phase, the current transmitted through resistance 33 and the primary winding means 20 is the numerical difference between these components of current.

The operation of the parallel resonant circuit 30 may be more fully appreciated by referring to the operating characteristics shown in Fig. 2 where curve A represents the voltage-current characteristic of the inductance 32, and curve B represents the voltage-current characteristic for the capacitance 31. At any value of voltage $V_1$, the net current derived from the alternating current circuit 29 is the horizontal distance between the two volt-ampere characteristics. It is therefore evident that the volt-ampere characteristic for the inductance 32 must be parallel to that of the capacitance 31 if the resultant or net current is to remain constant between the limits of voltages $V_1$ and $V_2$. The inductance 32 is designed so that its characteristic voltage-current curve is parallel, throughout a substantial range of voltage, to the characteristic curve of the capacitance 30.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, means for controlling the energization of said electric circuit and comprising an electric discharge device having a control member, means for controlling the potential of said control member comprising a capacitance, an alternating current circuit, means for charging said capacitance comprising a transformer having primary winding means and secondary winding means, and constant current means connected between said primary winding means and said alternating current circuit to render the charging rate of said capacitance substantially independent of voltage variations of said alternating current circuit.

2. In combination, an electric circuit, means for controlling the energization of said electric circuit and comprising an electric discharge device having a control member, means for controlling the potential of said control member comprising a capacitance, an alternating current circuit, means for charging said capacitance comprising a transformer having primary winding means and secondary winding means, constant current means connected between said primary winding means and said alternating current circuit to render the charging rate of said capacitance substantially independent of voltage variations of said alternating current circuit, and a circuit connected across said capacitance to initiate the charging operation thereof.

3. In combination, an electric circuit, means for controlling the energization of said electric circuit and comprising an electric discharge device having a control member, means for controlling the potential of said control member comprising a capacitance, an alternating current circuit, means for charging said capacitance comprising a transformer having primary winding means and secondary winding means, constant current means connected between said primary winding means and said alternating current circuit to render the charging rate of said capacitance substantially independent of voltage variations of said alternating current circuit, and a circuit connected across said capacitance comprising switching means for initiating the charging operation of said capacitance.

4. In combination, an electric circuit, means for controlling the energization of said electric circuit comprising an electric discharge device having a grid, means for producing a biasing potential, means for selectively connecting and disconnecting the last mentioned means from said grid, means for impressing a positive voltage on said grid and comprising a capacitance, an inductive device for charging said capacitance comprising primary winding means and secondary winding means and a unidirectional conducting device connected in circuit with said secondary w'nding means and said capacitance, an alternating current circuit, and constant current means connected between said alternating current circuit and said primary winding means to render the output voltage of said secondary winding means substantially independent of variations in the magnitude of the voltage of said alternating current circuit.

5. In combination, an electric circuit, means for controlling the energization of said electric circuit and comprising an electric discharge device having a control member, means for controlling the potential of said control member comprising a capacitance, an alternating current circuit, means for charging said capacitance comprising a saturable inductive device for producing a periodic voltage of peaked wave form, and constant current means connected between said saturable inductive device and said alternating current circuit to render the charging rate of said capacitance substantially independent of voltage variations of said alternating current circuit.

6. In combination, an electric circuit, means for controlling the energization of said electric circuit and comprising an electric discharge device having a control member, means for controlling the potential of said control member comprising a capacitance, an alternating current circuit, means for charging said capacitance to a predetermined voltage during a predetermined interval of time and comprising a saturable inductive device having primary winding means and secondary winding means connected to said capacitance, and constant current means connected between said primary winding means and said alternating current circuit to render the output voltage of said secondary winding means substantially independent of variations in the magnitude of the voltage of said alternating current circuit.

7. In combination, an electric circuit, means for controlling the energization of said electric circuit comprising an electric discharge device having a grid, means for controlling the potential of said grid including a capacitance and means for impressing on said control grid a biasing potential tending to maintain said discharge device nonconducting, means for charging said capacitance to produce a positive voltage sufficient to overcome the effect of said potential and comprising a saturable inductive device having primary winding means and secondary winding means connected to said capacitance, an alternating current circuit, and constant current means connected to said primary winding means to maintain the magnitude of the peaked output voltage of said secondary winding means substantially constant irrespective of variations in the magnitude of the voltage of said alternating current circuit.

8. In combination, an electric circuit, means for controlling the energization of said electric circuit and comprising an electric discharge device having a control member, means for controlling the potential of said control member comprising a capacitance and means for impressing on said control member a voltage to maintain said electric discharge device nonconducting, means connected to the last mentioned means for initiating the charging operation of said capacitance, means for charging said capacitance comprising a saturable inductive device for producing a periodic voltage of peaked wave form and comprising primary winding means and secondary winding means, said secondary winding means being connected to said capacitance, an alternating current circuit, and constant current means connected between said primary winding means and said alternating current circuit to maintain the magnitude of the voltage of peaked wave form substantially constant irrespective of variations in the magnitude of the voltage of said alternating current circuit.

9. In combination, an electric circuit, means for controlling the energization of said electric circuit and comprising an electric discharge device having a control grid, means for controlling the potential of said grid comprising a capacitance and means including a voltage divider for impressing on said grid a biasing potential sufficient to maintain said electric discharge device nonconducting, means for charging said capacitance comprising a saturable inductive device having primary winding means and secondary winding means, said secondary winding means being connected to said capacitance, an alternating current circuit, and a parallel resonant circuit of the nonlinear type comprising a capacitance and an inductance for transmitting an alternating current of substantially constant value to said primary winding means and for maintaining the magnitude of the output voltage of said secondary winding means at a substantially constant value irrespective of variations in the voltage of said alternating current circuit.

10. In combination, an electric circuit, means for controlling the energization of said circuit comprising an electric discharge device having a grid, a source of direct current, means for impressing on said grid a biasing potential tending to maintain said discharge device nonconducting and comprising a voltage divider and a circuit controlling means, a capacitance connected across said circuit controlling means, means for charging said capacitance and for impressing a positive voltage on said grid and comprising a saturable inductive device for producing a periodic voltage of peaked wave form and comprising primary winding means and secondary winding means and a unidirectional conducting device connected in circuit with said capacitance and said secondary winding means, an alternating current circuit, and a parallel resonant circuit of the nonlinear type comprising an inductance having a magnetic core structure and a capacitance connected between said alternating current circuit and said primary winding means to transmit a substantially constant current to said primary winding means irrespective of variations in the voltage of said alternating current circuit.

11. In combination, an electric circuit, means for controlling the energization of said electric circuit and comprising an electric discharge device having a grid, means for controlling the potential of said grid comprising a source of direct current, a voltage divider connected across said source and a resistance and a switch connected between a relatively negative point of said voltage divider and said grid, a capacitance connected across said resistance and said switch, means for charging said capacitance and for producing a positive voltage sufficient to overcome the effect of said biasing potential when said switch is in the open circuit position and comprising a saturable inductive device for producing a periodic voltage of peaked wave form and including primary winding means and secondary winding means and a unidirectional conducting device connected in circuit with said secondary winding means and said capacitance, an alternating current circuit, and a parallel resonant circuit of the nonlinear type tuned to the frequency of said alternating current circuit for transmitting to said primary winding means an alternating current of constant value to render the charging rate of said capacitance substantially independent of voltage variations of said alternating current circuit.

12. In combination, an electric circuit, means for controlling the energization of said electric circuit and comprising an electric discharge device having a grid, a source of direct current, means energized from said source of direct current and including a voltage divider, a circuit connected between said voltage divider and said grid for impressing thereon a biasing potential tending to maintain said discharge device nonconducting, a capacitance, means for charging said capacitance and for producing a positive voltage and comprising a saturable inductive device having primary winding means and secondary winding means and a unidirectional conducting device connected in circuit with said secondary winding means and said capacitance, an alternating current circuit, constant current means connected between said primary winding means and said alternating current circuit so that the voltage induced in said primary winding means is substantially independent of the voltage variations of said alternating current circuit, and means connected across said capacitance for initiating the charging operation thereof.

EARLE V. KINSMAN.